United States Patent
Jeong et al.

(10) Patent No.: US 9,793,691 B2
(45) Date of Patent: Oct. 17, 2017

(54) APPARATUS AND METHOD FOR PEELING COIL OF MOTOR

(71) Applicant: LG INNOTEK CO., LTD., Seoul (KR)

(72) Inventors: Lae Hoon Jeong, Seoul (KR); Joo Ryeong Park, Seoul (KR); Yun Tae Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 215 days.

(21) Appl. No.: 14/720,067

(22) Filed: May 22, 2015

(65) Prior Publication Data

US 2015/0336214 A1 Nov. 26, 2015

(30) Foreign Application Priority Data

May 23, 2014 (KR) .................. 10-2014-0062361

(51) Int. Cl.
- *B23K 26/40* (2014.01)
- *H01R 43/28* (2006.01)
- *H02G 1/12* (2006.01)
- *H02K 15/00* (2006.01)

(52) U.S. Cl.
CPC ............ *H02G 1/128* (2013.01); *H01R 43/28* (2013.01); *H02K 15/0056* (2013.01); *H02K 15/0068* (2013.01)

(58) Field of Classification Search
CPC .. B23K 26/409; H02K 15/0056; H01R 43/28; H02G 1/128

USPC ............... 219/121.68, 121.69, 121.6, 121.85
See application file for complete search history.

(56) References Cited

U.S. PATENT DOCUMENTS

| | | | | |
|---|---|---|---|---|
| 4,764,653 A | * | 8/1988 | Buhler | B23H 1/00 204/224 M |
| 4,815,673 A | * | 3/1989 | Wheeler | H02K 15/00 198/346.1 |
| 5,057,661 A | * | 10/1991 | Banner | B23K 20/023 219/121.69 |

FOREIGN PATENT DOCUMENTS

JP 04017989 A * 1/1992

* cited by examiner

*Primary Examiner* — Samuel M Heinrich
(74) *Attorney, Agent, or Firm* — Ked & Associates, LLP

(57) ABSTRACT

Disclosed is an apparatus for peeling a coil of a motor, including a pallet on which the coil is mounted; a conveying part formed long in a lengthwise direction and configured to convey the pallet; a clamper located at the side surface of the conveying part and formed to be movable toward the conveying part and to fix the tip portion of the coil; and a laser irradiating part located at a side surface of the conveying part to radiate laser at a peeling work spot and to peel a coating layer of a tip portion of the coil. Therefore, a bonding force between the coil and the bus bar can be easily increased.

11 Claims, 7 Drawing Sheets

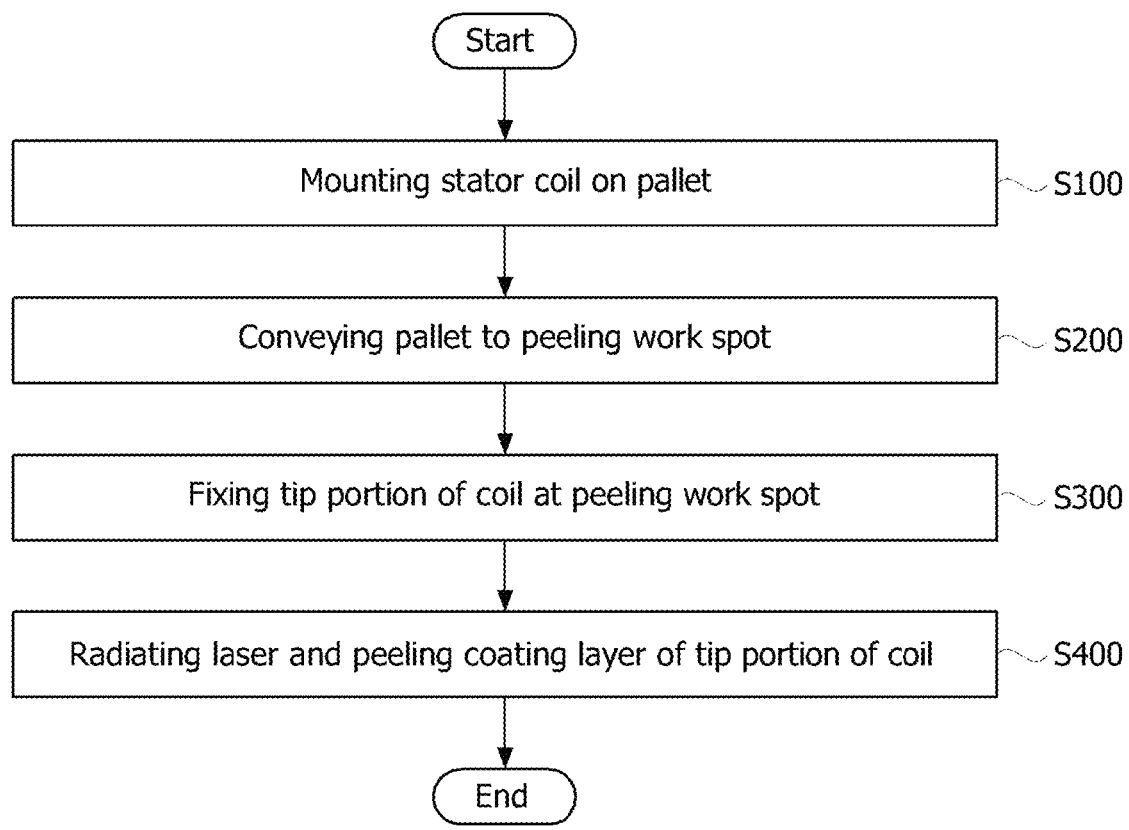

APPARATUS AND METHOD FOR PEELING COIL OF MOTOR

CROSS-REFERENCE TO RELATED APPLICATION

This application claims priority under 35 U.S.C. §119 to Korean Application No. 10-2014-0062361 filed on May 23, 2014, whose entire disclosure is hereby incorporated by reference.

BACKGROUND

1. Field

The present invention relates to an apparatus and method for peeling a coil of a motor, and more particularly, to an apparatus and method for peeling a coil of a motor using laser.

2. Background

A motor includes a shaft which is rotatably formed, a rotor which is coupled to the shaft, and a stator which is fixed to an inside of a housing, and the stator is installed along the circumference of the rotor at an interval. A coil which forms a rotating magnetic field is wound around the stator to cause an electric interaction with the rotor and thus to induce rotation of the rotor.

A bus bar which is electrically connected with the coil is disposed at an upper end of the stator. The bus bar includes a bus bar body having an approximately ring shape, and a terminal which extends from the bus bar body, is formed to be bent, and connected with a tip portion of the coil.

At this time, the tip portion of the coil is fused and coupled to the terminal of the bus bar. When a current flows and resistance heating is generated, a coating layer of the coil is continuously burnt during a fusing process, and a foreign substance remains between the coil and the terminal. When such a foreign substance remains between the coil and the terminal during the fusing process, a bonding force therebetween is considerably reduced.

BRIEF DESCRIPTION OF THE DRAWINGS

The embodiments will be described in detail with reference to the following drawings in which like reference numerals refer to like elements wherein:

FIG. 7 is a view illustrating a method of peeling the coil of the motor according to one embodiment of the present invention.

DETAILED DESCRIPTION

Hereinafter, exemplary embodiments of the present invention will be described in detail with reference to the accompanying drawings. Objects, particular advantages and novel characteristics of the present invention will be more apparent from the following detailed description and preferred embodiments in connection with the accompanying drawings. It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. In the following description, if it is considered that the specific description of the related and noticed functions or structures may obscure the gist of the present invention, the specific description will be omitted.

The terms used herein are merely to describe a specific embodiment, and do not limit the present invention. Further, unless the context clearly indicates otherwise, singular expressions should be interpreted to include plural expressions. It is understood that terms "comprises," "comprising," "includes" or "has" are intended to indicate the presence of features, numerals, steps, operations, elements and components described in the specification or the presence of combinations of these, and do not preclude the presence of one or more other features, numerals, steps, operations, elements and components, the presence of combinations of these, or additional possibilities.

| Key of Elements |
| --- |
| 10: coil |
| 11: tip portion |
| 110: pallet |
| 120: conveying part |
| 121: conveying belt |
| 122: driving motor |
| 130: clamper |
| 131: fixing bar |
| 140: laser irradiating part |

Figure 1:
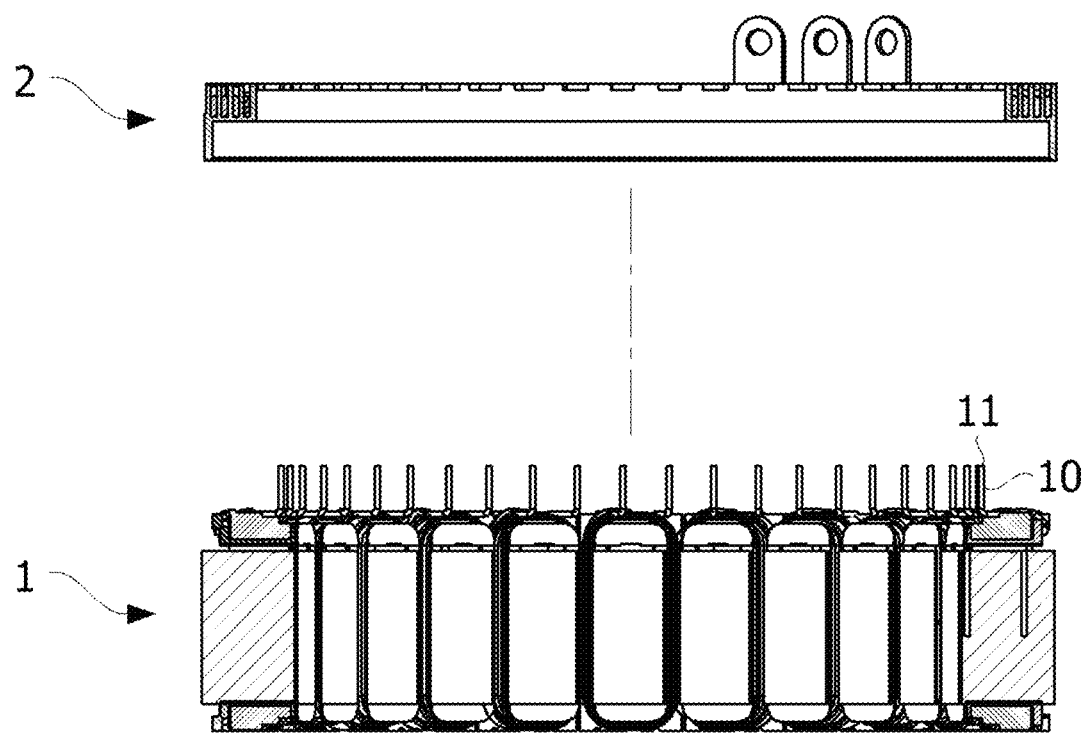
FIG. 1 is a view illustrating a stator coil and a bus bar.

FIG. 1 is a view illustrating a stator coil and a bus bar.

Referring to FIG. 1, a coil 10 which forms a rotating magnetic field is wound on a stator 1, and a tip portion 11 of the coil 10 may be formed to protrude toward an upward side of the stator 1. An annular bus bar 2 may be coupled to an upper end of the stator 1. At this time, the tip portion 11 of the coil 10 may be fused and coupled to a terminal of the bus bar 2.

As described above, when the coil 10 is fused to the terminal of the bus bar 2 in a state in which a coating layer thereof is not peeled, the coating layer of the coil 10 may be burnt due to resistance heating, and thus a foreign substance may remain. The remaining foreign substance remarkably deteriorates the bonding force between the tip portion 11 of the coil 10 and the terminal of the bus bar 2. Therefore, there has been proposed a method of mechanically the tip portion 11 of the coil 10. However, the method has a problem in that accuracy and efficiency in a production process are reduced. An apparatus and method for peeling a coil of a motor according to one embodiment of the present invention is an apparatus and method which is directed to provide to optically peel the coating layer of the coil 10 and thus to essentially solve the problem.

Figure 2:
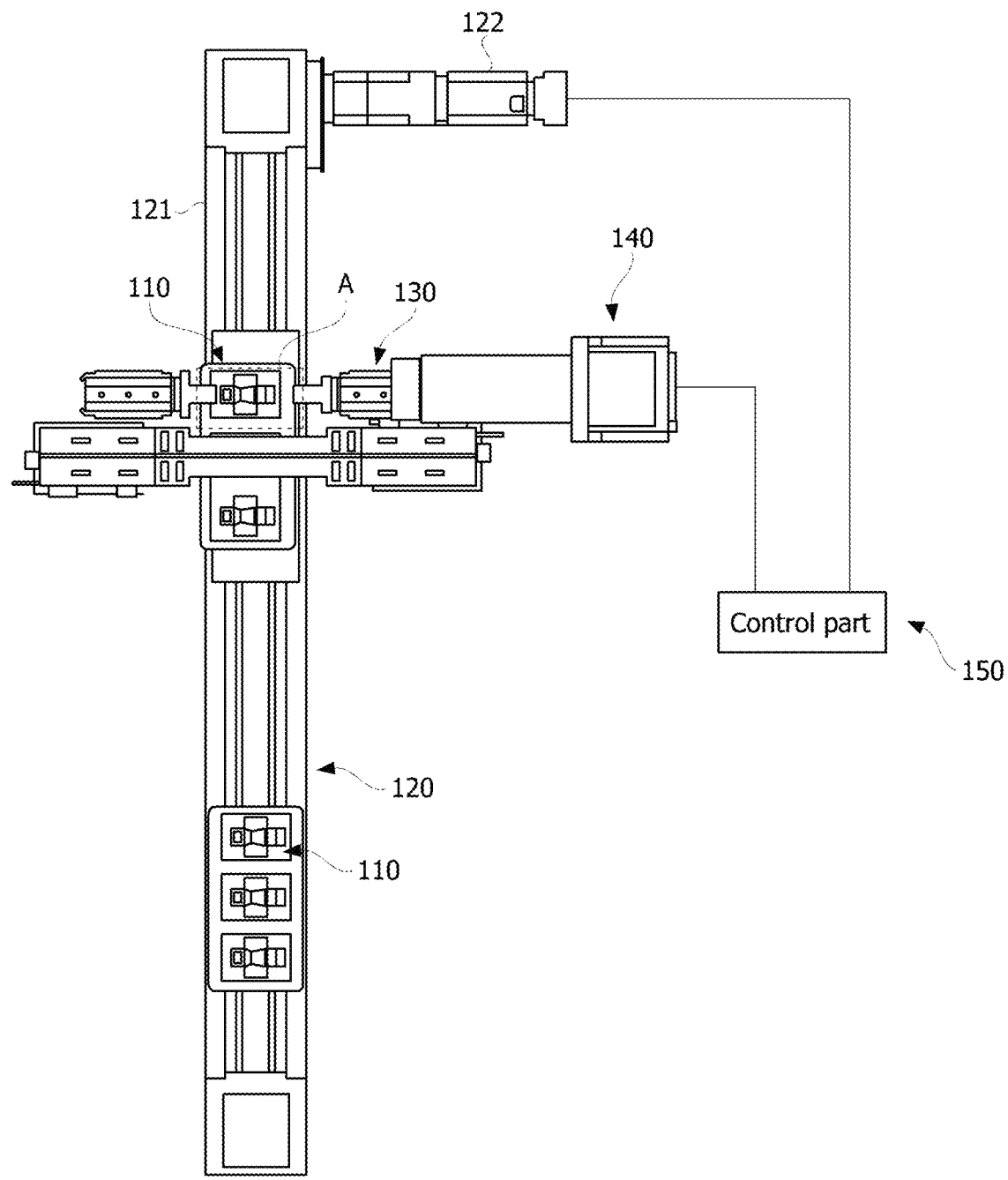
FIG. 2 is a view illustrating an apparatus for peeling a coil of a motor according to one embodiment of the present invention.

FIG. 2 is a view illustrating the apparatus for peeling the coil of the motor according to one embodiment of the present invention.

Referring to FIG. 2, the apparatus for peeling the coil of the motor according to one embodiment of the present invention may include a pallet 110, a conveying part 120, a clamper 130, and a laser irradiating part 140.

The coil 10 may be mounted on the pallet 110. At this time, the coil 10 may be mounted on the pallet 110 so that the tip portion 11 of the coil 10 stands upright. When a split-core type motor is manufactured, each coil which is wound around a split core may be mounted on the pallet 110, and when a cylindrical core type motor is manufactured, a single core may be mounted on the pallet 110.

Also, in a state before fused to the bus bar, a motor in a finished product state in which the housing, the stator, the rotor, and the shaft are assembled may be mounted on the pallet 110.

Meanwhile, to peel the coating layer 10b of the tip portion 11 of the coil having a circular cross section, the pallet 110 may be formed to be rotatable at a peeling work spot A. At this time, the pallet 110 may be formed so that a lengthwise direction of the tip portion 11 of the coil 10 is a direction of a rotating axis.

The pallet 110 may be conveyed while loaded on a conveying belt 121 of the conveying part 120.

The conveying part 120 serves to move the conveying belt 121 formed to extend in a lengthwise direction using a driving motor 122 and thus to convey the pallet 110 loaded on the conveying belt 121 to the peeling work spot A, and also to convey the pallet 110, in which a peeling work is completed, to a conveyor line of a post-assembling operation. Although not shown in the drawings, a separate jig module in which the pallet 110 is seated may be provided at the conveying belt 121.

Figure 3:
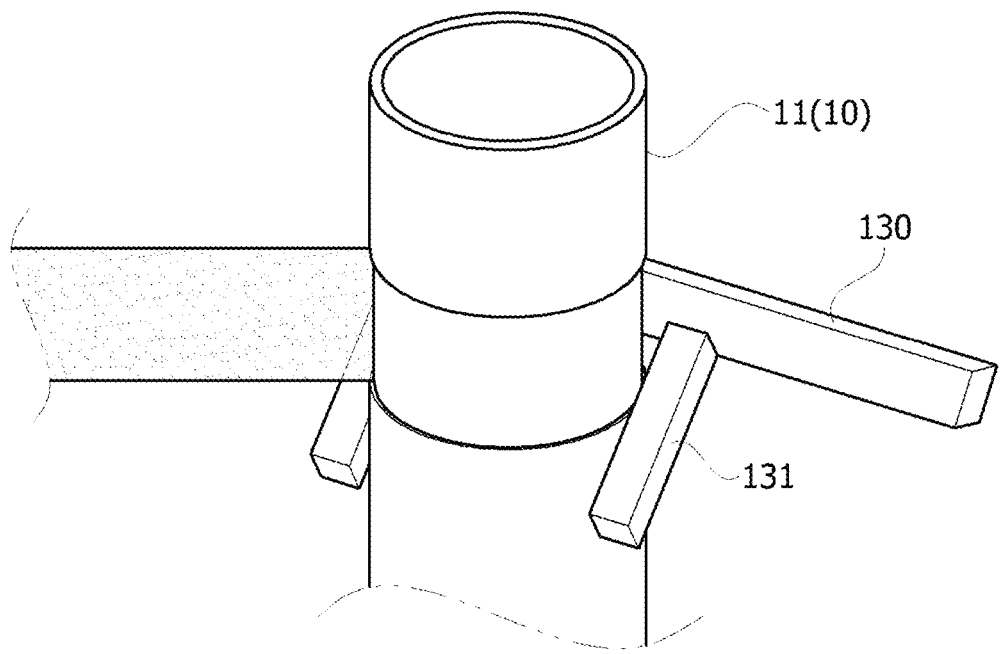
FIG. 3 is a view illustrating a tip portion of the coil fixed by a clamper.

FIG. 3 is a view illustrating the tip portion of the coil fixed by the clamper.

The clamper 130 may serve to clamp the tip portion 11 of the coil 10 at the peeling work spot A. The clamper 130 may include one pair of fixing bars 131 which is in contact with the tip portion 11 disposed therebetween while the tip portion 11 of the coil 10 stands upright. The clamper 130 may be disposed at both side surfaces of the conveying part 120, and may be formed to be movable to the peeling work spot A.

The laser irradiating part 140 may serve to radiate laser on the tip portion 11 of the coil 10 at the peeling work spot A so as to burn the coating layer 10b (FIG. 5), and thus to peel the tip portion 11 of the coil 10. The laser irradiating part 140 may be disposed at a side surface of the conveying part 120 based on the peeling work spot A.

In one embodiment, the laser irradiating part 140 may be formed to radiate ultra-short pulse laser (femtosecond region), and to accurately peel the coating layer without damage of a copper area 10a (FIG. 5) of the coil 10. In the case of the ultra-short pulse laser, a heat transfer to a peripheral area other than a processing area and damage of the peripheral area hardly occur.

A wavelength, a pulse width, a pulse repetition rate, and pulse energy of a laser pulse radiated from the laser irradiating part 140 may be changed properly in consideration of a diameter of the coil 10, a thickness of the coating layer 10b, a length of a peeling area, and so on.

A scanner may be disposed at a position adjacent to the laser irradiating part 140. The scanner may change a direction of the laser pulse through a lens or a reflecting mirror without changing a position of the laser irradiating part 140.

Figure 4:
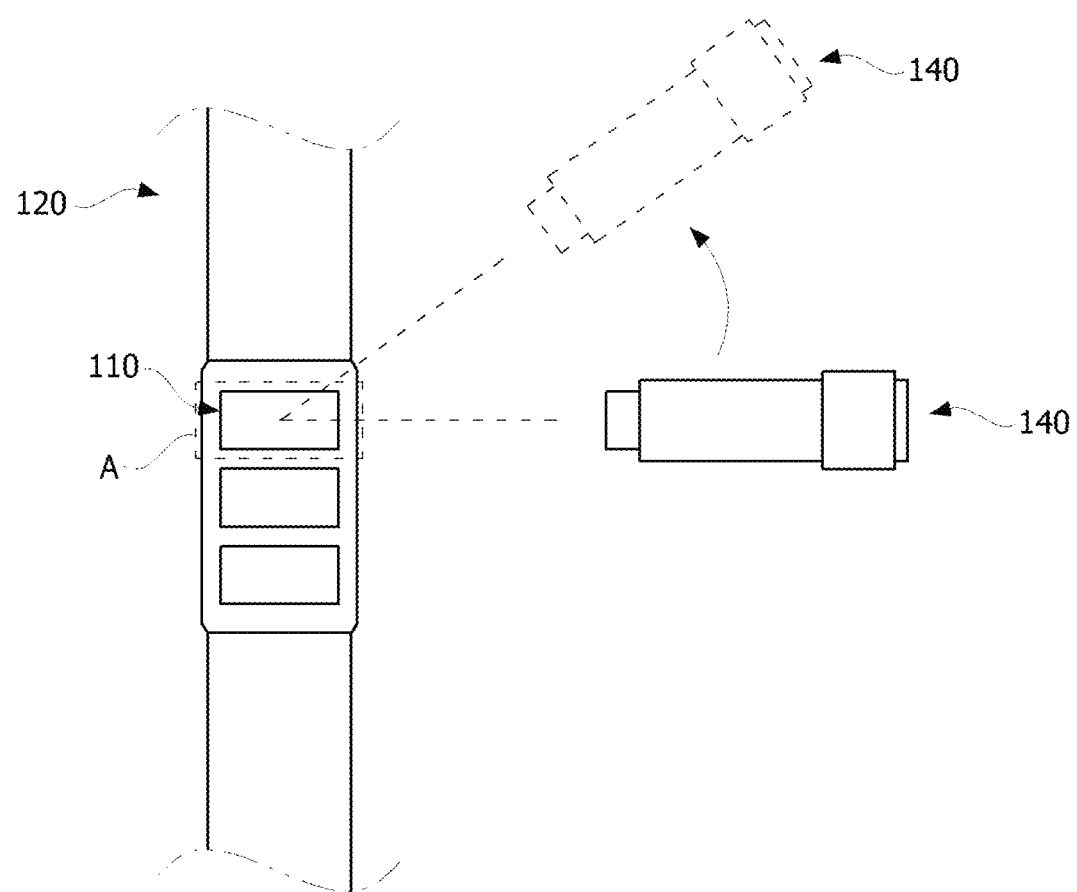
FIG. 4 is a view illustrating a laser irradiating part rotated around a peeling work spot.

FIG. 4 is a view illustrating the laser irradiating part rotated around the peeling work spot.

Also, as illustrated in FIG. 4, the laser irradiating part 140 may be formed to be rotatable about the peeling work spot A. This is to change an irradiation area of the laser, and thus to peel the coating layer 10b of the tip portion 11 of the coil 10 having the circular cross section. And the laser irradiating part 140 may be formed so that a height thereof is controlled up and down. This is to control a length of the peeling area of the coil 10 according to characteristics of the motor.

Figure 5:
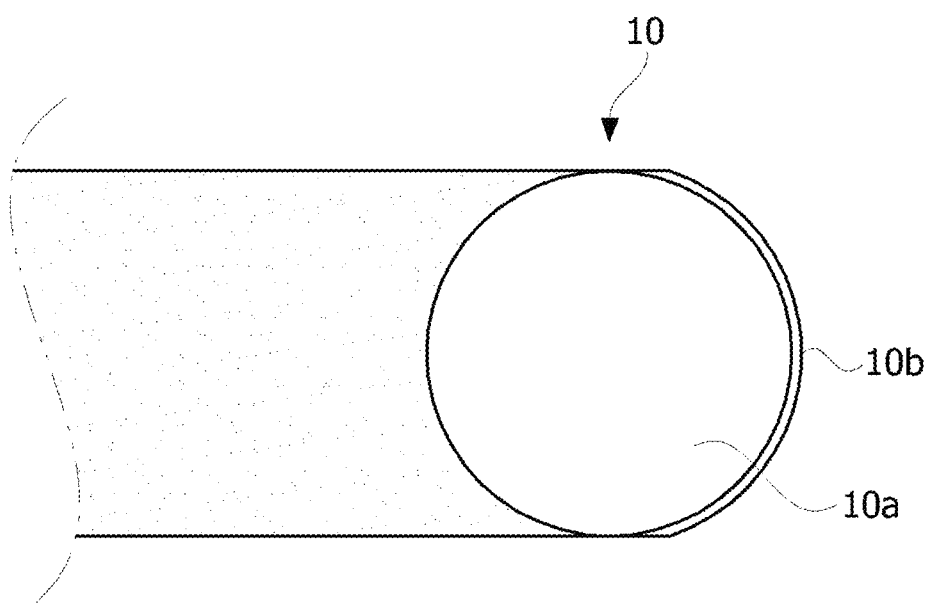
FIG. 5 is a cross-sectional view of the coil in which a coating layer thereof is peeled by radiated laser.
Figure 6:
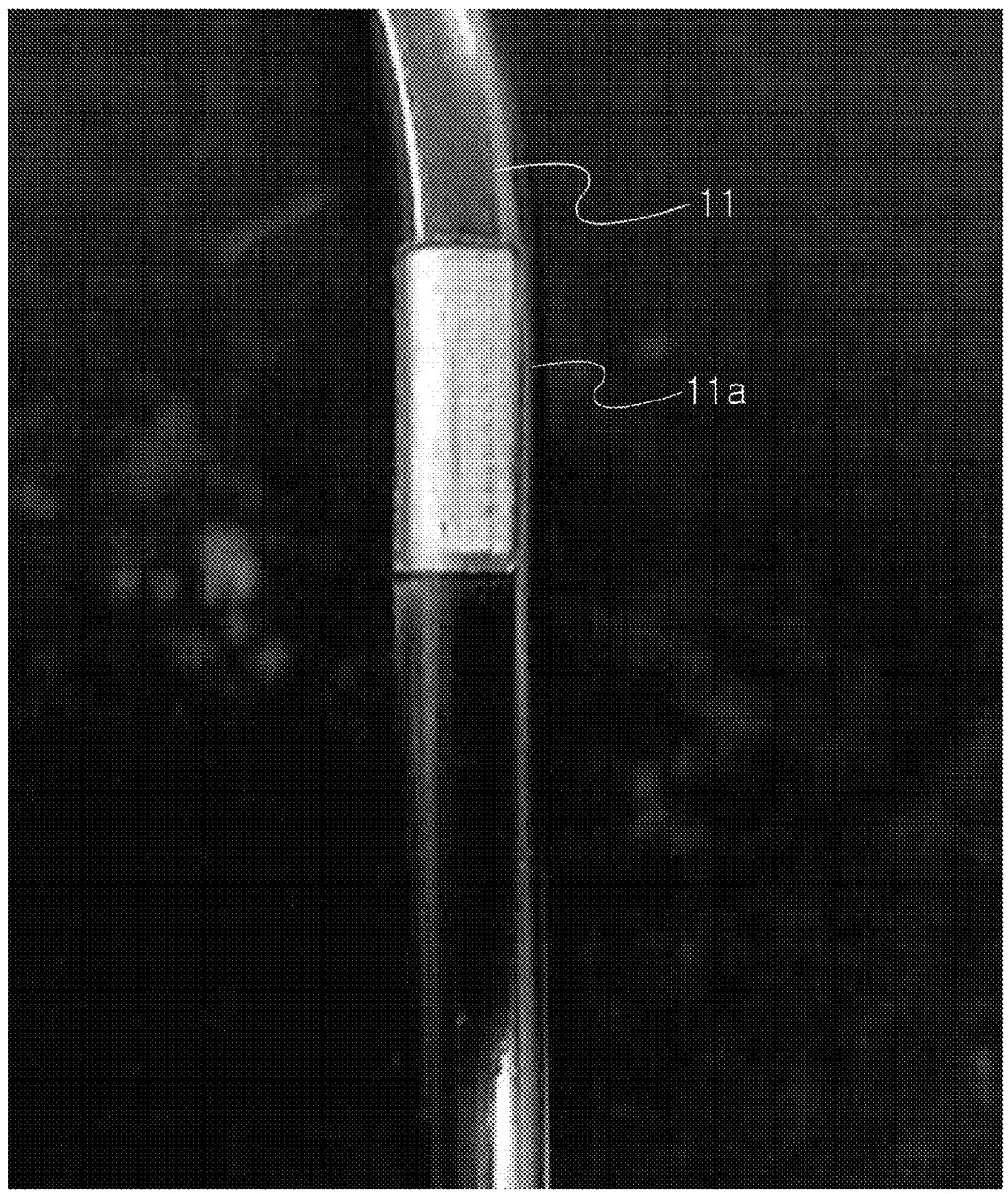
FIG. 6 is an image illustrating a peeling area of the coil which is peeled by the apparatus for peeling the coil of the motor of FIG. 2.

FIG. 5 is a cross-sectional view of the coil in which the coating layer thereof is peeled by the radiated laser, and FIG. 6 is an image illustrating the peeling area of the coil which is peeled by the apparatus for peeling the coil of the motor of FIG. 2; and Referring to FIG. 5, it may be understood that the coating layer 10b of the coil 10 is peeled at a laser radiated area. As a result, it may be understood that the peeling area 11a is formed at the tip portion 11, as illustrated in FIG. 6.

The peeling area of the coil 10 serves to increase a fusing strength between the coil 10 and the bus bar 2. When the coating layer 10b of the coil 10 is peeled by the laser, a remaining substance of the coating layer 10b does not remain between bonding surfaces, and thus the bonding force may be considerably increased.

Meanwhile, the peeling area of the coil 10 may not be formed throughout a circumferential direction. Even when only a part of the area which is in contact with the terminal of the bus bar 2 in the circumferential direction is peeled, the bonding force may be increased.

A control part 150 may control the conveying part 120 so that the pallet 110 on which the coil 10 to be peeled is loaded is located at the peeling work spot A. Also, rotation of the pallet 110 or rotation and up/down movement of the laser irradiating part 140 may be controlled according to a position, a length, and a width of the peeling area of the coil 10.

FIG. 7 is a view illustrating a method of peeling the coil of the motor according to one embodiment of the present invention.

Referring to FIG. 7, in the method of peeling the coil of the motor according to one embodiment of the present invention, first, the coil may be mounted on the pallet (S100).

Then, the conveying part 120 conveys the pallet 110 to the peeling work spot A (S200).

And the clamper 130 may fix the tip portion 11 of the coil 10 at the peeling work spot A (S300). When the corresponding pallet 110 arrives at the peeling work spot A, the clamper 130 may be moved toward the peeling work spot A, and then may insert the coil 100 between fixing bars 131.

And the laser irradiating part 140 may radiate the laser and may peel the coating layer 10b of the tip portion 11 of the coil 10. At this time, while or before the laser is radiated, the laser irradiating part 140 may be moved so that the radiated area is changed according to a position, a length, and a width of the peeling area 11a.

Until now, the apparatus and method for peeling the coil of the motor according to one embodiment of the present invention has been described with reference to the accompanying drawings.

According to one embodiment of the present invention, since the coating layer can be easily peeled by radiating the laser onto the tip portion of the coil, the bonding force between the coil and the bus bar can be further easily increased.

Also, according to one embodiment of the present invention, since the irradiation position of the laser can be configured to be controlled, the width, the length, and the position of the peeling area of the coil can be easily changed corresponding to the structure of the stator and the bus bar.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

The present invention is directed to an apparatus and method for peeling a coil of a motor, which is capable of easily peeling a tip portion of coil connected with a terminal of a bus bar and thus increasing a bonding force between the coil and the bus bar.

Additional aspects of the invention will be set forth in part in the description which follows and, in part, will be obvious from the description, or may be learned by practice of the invention.

According to an aspect of the present invention, there is provided an apparatus for peeling a coil of a motor, including a pallet on which the coil is mounted; a conveying part formed long in a lengthwise direction and configured to convey the pallet; and a laser irradiating part located at a side surface of the conveying part to radiate laser at a peeling work spot and to peel a coating layer of a tip portion of the coil.

The apparatus may further include a clamper located at the side surface of the conveying part, formed to be movable toward the conveying part, and configured to fix the tip portion of the coil.

The apparatus may further include a control part configured to control movement of the conveying part so that the tip portion of the coil is located at the peeling work spot.

The tip portion of the coil may be mounted on the pallet to stand upright.

The pallet may be formed to be rotatable.

The control part may control a rotation of the pallet corresponding to an input signal.

The laser irradiating part may be formed to be rotatable around the peeling work spot.

The laser irradiating part may be formed to be movable up and down.

The control part may control a rotation or an up/down movement of the laser irradiating part in response to an input signal.

According to another aspect of the present invention, there is provided a method of peeling a coil of a motor, including a) mounting a coil on a pallet; b) conveying the pallet to a peeling work spot; c) fixing a tip portion of the coil at the peeling work spot; and d) radiating laser and peeling the tip portion of the coil.

In the d), a coating layer corresponding to a part of the tip portion of the coil in a circumferential direction may be peeled.

In the d), the pallet may be rotated at the peeling work spot.

In the d), a laser irradiating part may be rotated around the peeling work spot.

In the d), the laser irradiating part may be moved up and down at the peeling work spot.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for peeling a coil of a motor, the apparatus comprising:
   a pallet on which the coil is mounted so that a tip portion of the coil stands upright;
   a conveyer having a conveyer belt extending in a lengthwise direction and on which the pallet is mounted; and
   a laser disposed at a side surface of the conveyer to radiate laser light at a peeling work spot and to peel a coating layer of the tip portion of the coil,
   wherein a lengthwise direction of the tip portion of the coil and a direction of a rotating axis of the pallet are parallel.

2. The apparatus of claim 1, further comprising a clamper located at the side surface of the conveyer, formed to be movable toward the conveyer, and configured to fix the tip portion of the coil.

3. The apparatus of claim 1, wherein the pallet is formed to be rotatable at the peeling work spot.

4. The apparatus of claim 1, wherein the laser is formed to be movable up and down in direction of a rotating axis of the pallet.

5. The apparatus of claim 1, the clamper includes a pair of fixing bars which contact the tip portion disposed there between while the tip portion of the coil stands upright.

6. The apparatus of claim 5, further comprising a control part configured to control at least one of a movement of the conveyer, a rotation of the pallet, or a movement of the laser.

7. A method of peeling the coil of the motor of claim 1, the method comprising:
   mounting the coil on the pallet;
   conveying the pallet to the peeling work spot;
   fixing the tip portion of the coil at the peeling work spot; and
   radiating laser and peeling the tip portion of the coil.

8. The method of claim 7, wherein, in radiating laser and peeling the tip portion of the coil, the coating layer corresponding to a part of the tip portion of the coil in a circumferential direction is peeled.

9. The method of claim 7, wherein, in radiating laser and peeling the tip portion of the coil, the pallet is rotated at the peeling work spot.

10. The method of claim 7, wherein, in radiating laser and peeling the tip portion of the coil, the laser is rotated around the peeling work spot.

11. The method of claim 7, wherein, in radiating laser and peeling the tip portion of the coil, the laser is moved up and down at the peeling work spot.

* * * * *